Jan. 31, 1956 M. G. TORMO 2,733,034
PIPE HANGERS
Filed June 17, 1952
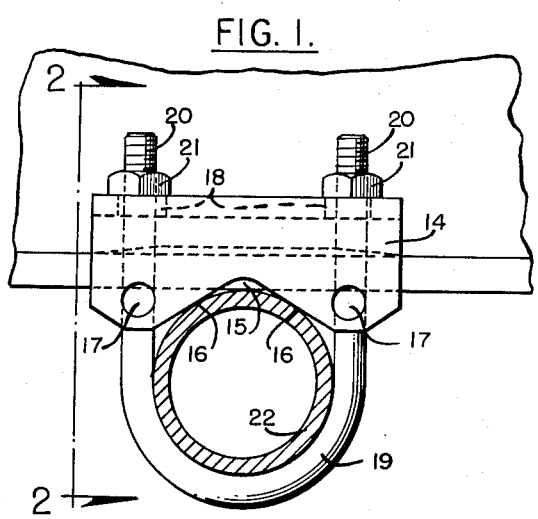
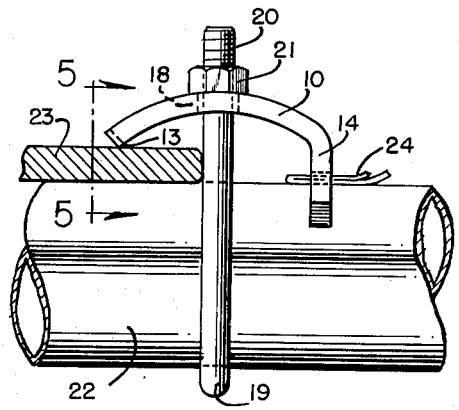
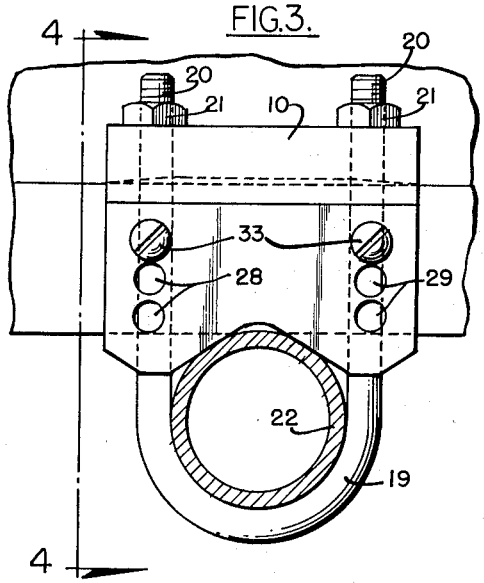
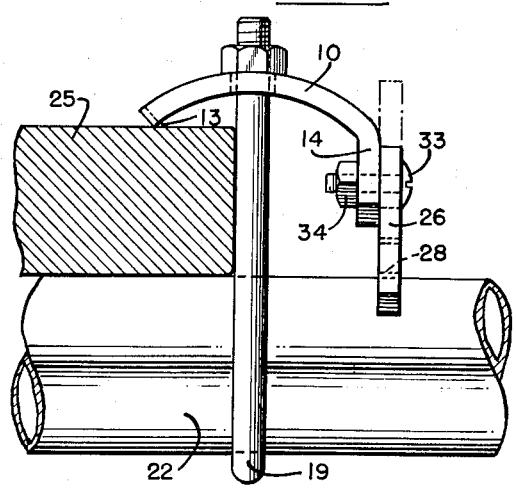
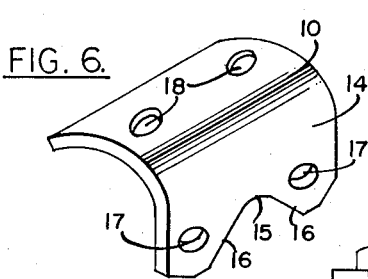
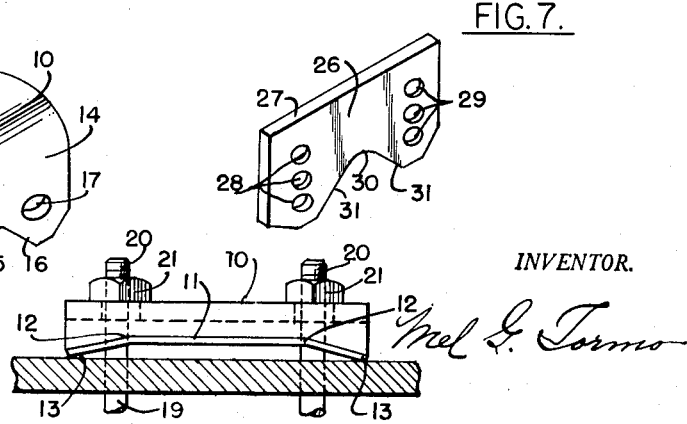
INVENTOR.
Mel G. Tormo United States Patent Office 2,733,034
Patented Jan. 31, 1956

2,733,034

PIPE HANGERS

Mel G. Tormo, Woodside, N. Y.

Application June 17, 1952, Serial No. 293,882

1 Claim. (Cl. 248—72)

The present invention relates to a pipe hanger and it consists in the combinations, constructions and arrangements of parts herein described and claimed.

Generally there is provided a pipe hanger consisting of a novel jaw of generally arcuate shape one leg of which is bent to form a pair of teeth which are adapted to engage the upper side of a common building beam flange and the other end of which is provided centrally with an indentation whose sides extend at 30° angles with respect to the horizontal and which indentation is adapted to receive therein the upper portion of a pipe. A U-shaped bolt extends through openings in the jaw member and is provided with nuts whereby the same may be attached to the jaw and support the underside of a pipe. The openings in the arcuate jaw member extend laterally in the form of slots so that differently sized U-bolts may be received therethrough to thus accommodate different sizes of pipes. The device is such that it will securely hold pipes of different sizes while at the same time allowing for contraction and expansion due to temperature conditions. In another form of the invention, where it is desired to attach the device to flanges of relatively greater thickness, the jaw member is provided with an adapter which is adjustably attached to that end thereof opposite to the end having the teeth formed therein. The adapter is provided centrally upon its lower side with an indentation as above set forth. The end of the arcuate jaw member which contains the teeth is preferably hardened so that the teeth may overcome the semi-tempered surface crust of the flanges with which they may be engaged.

It is accordingly an object of the invention to provide a novel pipe hanger having novel means for absorbing normal expansion and contraction of pipes carried thereby while at the same time providing secure means for mounting the same upon the flanges of conventional structural steel members.

Another object of the invention is to provide a device of the character set forth which is simple in construction, inexpensive to manufacture and yet effective and efficient in use.

Another object of the invention is to provide, in a device of the character set forth, a novel adapter member forming a part of the invention.

A further object of the invention is to provide, in a device of the character set forth, novel means for attaching a ground wire to a pipe.

Other and further objects of the invention will become apparent from a reading of the following specification taken in conjunction with the drawing, in which:

Figure 1 is a front elevational view of an embodiment of the invention,

Figure 2 is a side elevational view of Figure 1,

Figure 3 is a view similar to Figure 1 but showing a modified form the invention may assume, Figure 4 is a sectional view taken along line 4—4 of Figure 3, Figure 5 is a sectional view taken along line 5—5 of Figure 2, Figure 6 is a perspective view of a jaw member forming a part of the invention, and Figure 7 is a perspective view of an adapter forming a part of the invention.

Referring more particularly to the drawing, there is shown therein a pipe hanger comprising a generally horizontally extending arcuate jaw 10 having its convex face upwardly extending and its concave face upon the underside thereof. The forward edge 11 of the arcuate jaw member 10 has the side edge portions thereof bent downwardly, as indicated at 12, to form teeth 13 and the rearward end of the jaw member 10 has integrally formed therewith a vertically dependent plate 14 having a centrally disposed indentation 15 formed in the lower end thereof. The indentation 15 has two side portions 16 each of which lie at an angle of thirty degrees to the horizontal and, adjacent each lower corner of the plate 14 there is provided a circular opening 17.

In the uppermost portion of the jaw member 10 there is provided adjacent each side thereof a pair of laterally extending slots 18 through which the arms of a U-bolt 19 are adapted to extend. The legs of the U-bolt are each threaded, as indicated at 20, and each has threadably mounted thereon a nut 21.

In this form of the invention it will be apparent that a pipe 22 may be encompassed by the lower portion of the U-bolt 19 and that the teeth 13 may engage the upper-face of a relatively thin flange 23 conventionally found in structural steel members utilized in the construction of buildings. It will also be apparent that the member 10 and its integrally formed plate 14 will be formed of a spring steel possessing sufficient yieldability to absorb any contraction or expansion due to temperature conditions in the pipe 22 while at the same time possessing sufficient strength so that the points 13 will securely engage the upper side of the flange while holding the pipe 22 securely against the underside thereof. It will also be apparent that the indentation 15, having the angularly disposed sides 16, will be adaptable for receiving successive pipe sizes, it being understood that the different sized pipes will require differently sized U-bolts 19 and that hence the slots 18 will be of sufficient width to accommodate the legs of such U-bolts.

Where the expansion requirements of the pipe are not considered of importance, and the grounding of the pipe being supported is deemed advisable, a copper wire 24 of suitable diameter may be looped and inserted between the pipe 22 and the indentation 15 as shown in Figure 2 thus establishing a positive electrical contact of permanent character, as required by the various boards of fire underwriters.

In Figures 3 to 6, inclusive, there is illustrated a modified form the invention may assume. In this case the device is designed to accommodate flanges 25 of relatively great thickness and in such case an adapter plate 26 which is provided with a horizontally extending upper edge 27 is adjustably attached to the plate 14 by means of two vertically extending series of openings 28 and 29 each series being arranged adjacent each side of the plate 26. The plate 26 is centrally provided with an indentation 30 having sides 31 which extend at angles of thirty degrees to the horizontal. A pair of bolts 33 extend selectively through the openings 28 and 29 and the openings 17 to fasten the plate 26 to the plate 14 and are each provided with nuts 34.

In this form of the invention it will be apparent that the adapter 26 will take care of flanges 25 of greater thickness than the relatively thin flanges 23 where no adapter 26 is needed.

It will also be apparent that the portions of the member 10 adjacent the points 13 will be tempered to take care of the relatively soft crust upon the conventional flanges 23 and 25.

While but two forms of the invention have been shown and described herein, it will be readily apparent to those skilled in the art that many minor modifications may be made without departing from the spirit of the invention or the scope of the appended claim.

What is claimed is:

A device of the character described comprising an arcuate body, teeth formed at one end of said body, a vertically dependent plate portion formed integrally with the other end of said body, said body having a pair of centrally disposed laterally spaced transverse slots, each adjacent one side thereof, a pipe supporting U-bolt having its legs received in said slots, nuts for each of said legs, said plate portion having a centrally disposed indentation in the lower end thereof, the depending side portions of said indentation having bolt holes, and an adapter plate vertically adjustably attached to said dependent plate portion and having an indentation identical with that of said dependent plate, said adapter plate in the depending side portion of said indentation having a plurality of vertically spaced adjusting holes, and bolt means extending through any of the adjusting holes and the bolt holes of the vertically dependent plate portion to hold the adapter plate upon the body, said indentations being adapted to receive therewithin a pipe, said adapter plate indentation being aligned horizontally with said plate portion indentation when said last mentioned bolt means extend through the lowermost of said adjusting holes in said adapter plate whereby to provide a greater gripping surface on the pipe when said adapter plate is not required to space said arcuate body from the pipe.

References Cited in the file of this patent

UNITED STATES PATENTS

| 455,694 | Steltz | July 7, 1891 |
| 628,218 | Ashworth | July 4, 1899 |
| 923,805 | Blake | June 8, 1909 |
| 1,281,531 | Dietrich | Oct. 15, 1918 |
| 1,319,652 | Korns | Oct. 21, 1919 |
| 2,175,453 | Barcy | Oct. 10, 1939 |